(12) United States Patent  (10) Patent No.: US 9,150,088 B2
Yang  (45) Date of Patent: *Oct. 6, 2015

(54) AUTOMOTIVE WINDSHIELD COVER STRUCTURE

(71) Applicant: Formosa Saint Jose Corp., Taipei (TW)

(72) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/277,215

(22) Filed: May 14, 2014

(65) Prior Publication Data

US 2015/0224863 A1  Aug. 13, 2015

(30) Foreign Application Priority Data

Feb. 7, 2014  (TW) .............................. 103104120 A
Apr. 11, 2014  (TW) .............................. 103113463 A

(51) Int. Cl.
*B60J 11/00* (2006.01)
*B60J 11/08* (2006.01)

(52) U.S. Cl.
CPC ........................................ *B60J 11/08* (2013.01)

(58) Field of Classification Search
USPC ................. 296/95.1, 136.01, 136.03, 136.07, 296/136.08, 136.1
See application file for complete search history.

(56) References Cited

U.S. PATENT DOCUMENTS

| | | | | | |
|---|---|---|---|---|---|
| 3,024,717 | A | * | 3/1962 | Rozek | 454/275 |
| 3,042,111 | A | * | 7/1962 | Wytovich | 150/168 |
| 3,046,048 | A | * | 7/1962 | Cheney | 296/95.1 |
| 4,821,785 | A | * | 4/1989 | Rolan | 150/166 |
| 7,090,266 | B1 | * | 8/2006 | Price | 293/128 |
| 7,673,924 | B1 | * | 3/2010 | Lau | 296/95.1 |
| 8,656,968 | B2 | * | 2/2014 | Lin | 150/168 |

* cited by examiner

*Primary Examiner* — Joseph D Pape
(74) *Attorney, Agent, or Firm* — Juan Carlos A. Marquez; Bacon & Thomas PLLC

(57) ABSTRACT

Provided is an automotive windshield cover structure for removably covering a windshield of a vehicle. The automotive windshield cover structure includes a windshield cover, a first extension portion and a second extension portion. Or, the automotive windshield cover structure includes a windshield cover, at least one air vent portion and at least one add-on portion. The automotive windshield cover structure covers the windshield of the vehicle effectively and blocks rain, snow or sunlight, such that the windshield cover cannot be removed from the windshield by wind or lifted by wind. The first extension portion and the second extension portion are adhered to and engaged smoothly and tightly with door receiving grooves at the left front and right front portions of the vehicle, respectively, when a door of the vehicle shuts, to prevent water droplets from being guided across the automotive windshield cover structure to flow into or seep into the vehicle.

12 Claims, 17 Drawing Sheets

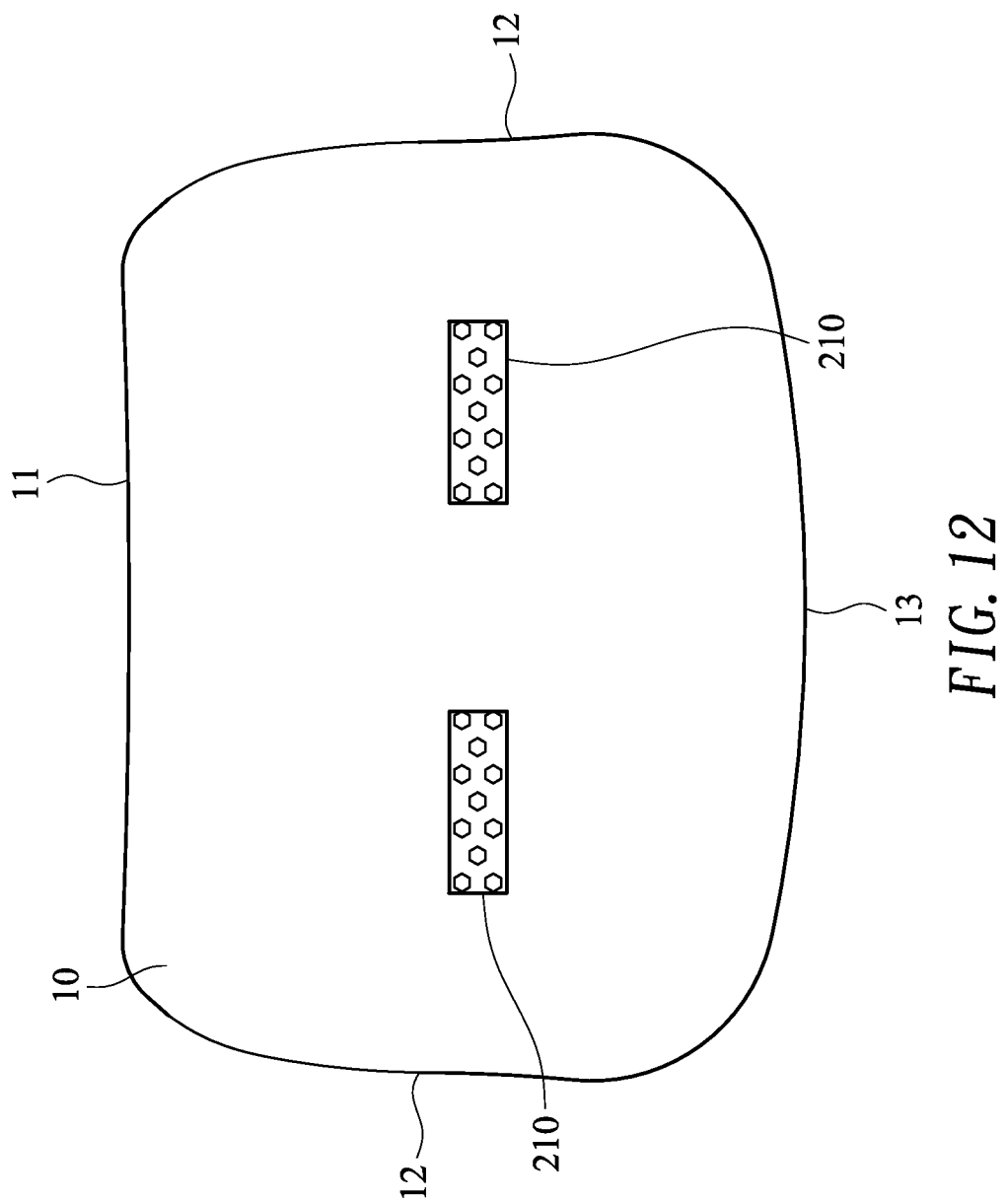

AUTOMOTIVE WINDSHIELD COVER STRUCTURE

BACKGROUND OF THE INVENTION

1. Technical Field

The present invention relates to automotive windshield cover structures, and more particularly, to an automotive windshield cover structure with a plurality of first magnetic strips.

2. Description of Related Art

As the demand for transport is on the rise, use of vehicles is ever-increasing, and thus automotive accessories and apparatuses are also in increasingly wide use. The aforesaid trend brings about the emergence of the shielding apparatuses for protecting vehicles or automotive windshields, for example, by preventing damage otherwise caused by rain or snow.

Although the protective or shielding apparatuses for use with automotive windshield have been there for a long while, their conventional design remains unchanged, that is, a fabric that covers and is held with rods. The prior art goes without careful evaluation of reality. In practice, snow, water droplets or foreign bodies, which are initially intercepted by the fabric, are guided across or ooze through the fabric to enter the vehicle, not to mention that the fabric is often removed or lifted by gusts of wind, thereby failing to protect or cover the vehicle.

Accordingly, it is important for automotive accessory manufacturers to invent an automotive windshield cover structure that prevents snow, water droplets, or foreign bodies from flowing into or seeping into a vehicle, blocks sunlight to protect meters, parts and components inside the vehicle and keep the vehicle cool on sunny days, and is suitable for mass production at low costs.

SUMMARY OF THE INVENTION

It is an objective of the present invention to provide an automotive windshield cover structure which includes a windshield cover, a first extension portion and a second extension portion, or, the automotive windshield cover structure includes a windshield cover, at least one air vent portion and at least one add-on portion. The automotive windshield cover structure is tightly and smoothly adhered to a vehicle body of a vehicle by first magnetic strips to cover a windshield of the vehicle, thereby preventing accumulation of snow and water and blocking sunlight. Alternatively, the automotive windshield cover structure is adhered tightly to and engaged with a door receiving groove of the vehicle by the first magnetic strips to ensure that the automotive windshield cover structure will not be removed or lifted by gusts of wind and snow, water or foreign bodies will not flow into or seep into the vehicle.

In order to achieve the above and other objectives, the present invention provides an automotive windshield cover structure, comprising: a windshield cover for removably covering a windshield of a vehicle, the windshield cover having an upper edge, two lateral sides extending from the upper edge, and a lower edge opposing the upper edge and connecting with the two lateral sides; a first extension portion extended outward from the windshield cover, disposed at one of the two lateral sides, and positioned proximate to the upper edge; and a second extension portion extended outward from the windshield cover, disposed at another one of the two lateral sides, and positioned proximate to the upper edge; wherein, the first extension portion and the second extension portion each encloses at least one first magnetic strip, respectively, and thus adhere to door receiving grooves on two opposing sides of the vehicle, respectively.

In order to achieve the above and other objectives, the present invention further provides an automotive windshield cover structure, comprising: a windshield cover for removably covering a windshield of a vehicle, the windshield cover having an upper edge, two lateral sides extending from the upper edge, a lower edge opposing the upper edge and connecting with the two lateral sides; at least one air vent portion formed on the wind shield cover; and at least one add-on portion attached firmly on the wind shield cover, wherein two opposite ends of the add-on portion are not in contact with the windshield cover to form two venting holes, and each said air vent portion is shielded by one said add-on portion.

Implementation of an automotive windshield cover structure of the present invention at least involves the following inventive steps:

1. The automotive windshield cover structure is adhered tightly to a door receiving groove of a vehicle and enables a door of the vehicle to shut tightly, so as to effectively prevent snow, water or foreign bodies from being guided through the door receiving groove and across the automotive windshield cover structure to eventually flow into or seep into the vehicle.

2. The first magnetic strips assist the automotive windshield cover structure in covering a windshield of the vehicle tightly and preventing snow or water droplets from accumulating on the windshield.

3. The automotive windshield cover structure blocks sunlight to effectively cool the vehicle and protect meters, parts and components inside the vehicle.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein:

FIG. 12 is a schematic top view of a windshield cover and at least one air vent portion according to the embodiment of FIG. 11.

DETAILED DESCRIPTION OF THE EMBODIMENT OF THE INVENTION

Figure 1A:
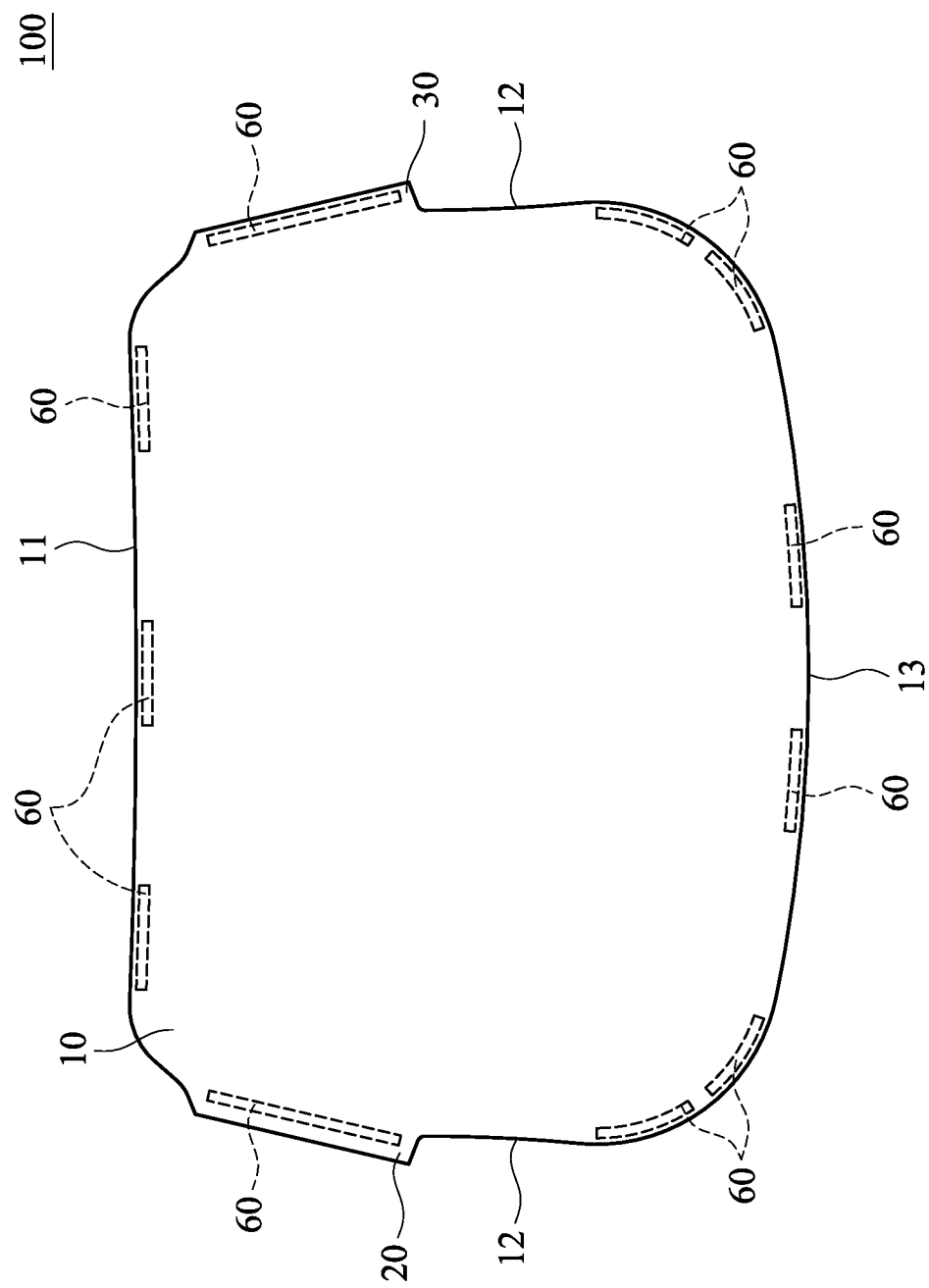
FIG. 1A is a schematic top view of an automotive windshield cover structure according to an embodiment of the present invention.

Referring to FIG. 1A, in an embodiment of the present invention, an automotive windshield cover structure 100 is removably mounted on a windshield of a vehicle. The automotive windshield cover structure 100 comprises a windshield cover 10, a first extension portion 20, a second extension portion 30.

Referring to FIG. 1A, the windshield cover 10 removably covers the windshield of the vehicle. The windshield cover 10 has an upper edge 11, two lateral sides 12 extending from the upper edge 11, and a lower edge 13 opposing the upper edge 11 and connecting with two lateral sides 12. The windshield cover 10 is large enough to cover the whole windshield and extends to a portion of a vehicle body of the vehicle, wherein the portion of the vehicle body surrounds the windshield.

The windshield cover 10 is made of a waterproof material, an opaque material, or a waterproof and opaque material. When made of the waterproof material, the windshield cover 10 prevents snow or water from accumulating on the windshield and prevents the snow or water on the windshield from freezing. When made of the opaque material or the waterproof and opaque material, the windshield cover 10 also blocks sunlight to cool the vehicle and protect meters, parts and components inside the vehicle against damage otherwise caused by prolonged exposure to sunlight.

Referring to FIG. 1A, the first extension portion 20 is extended outward from the windshield cover 10, disposed at one of the two lateral sides 12, and positioned proximate to the upper edge 11. The length by which the first extension portion 20 is extended from the lateral side 12 is large enough to allow the first extension portion 20 to be inserted into a door receiving groove 80 disposed on one side of the vehicle.

Referring to FIG. 1A, the second extension portion 30 is extended outward from the windshield cover 10, disposed at the other one of the two lateral sides 12, and positioned proximate to the upper edge 11. The length by which the second extension portion 30 is extended from the lateral side 12 is large enough to allow the second extension portion 30 to be inserted into a door receiving groove 80 disposed on the other side of the vehicle.

Figure 1B:
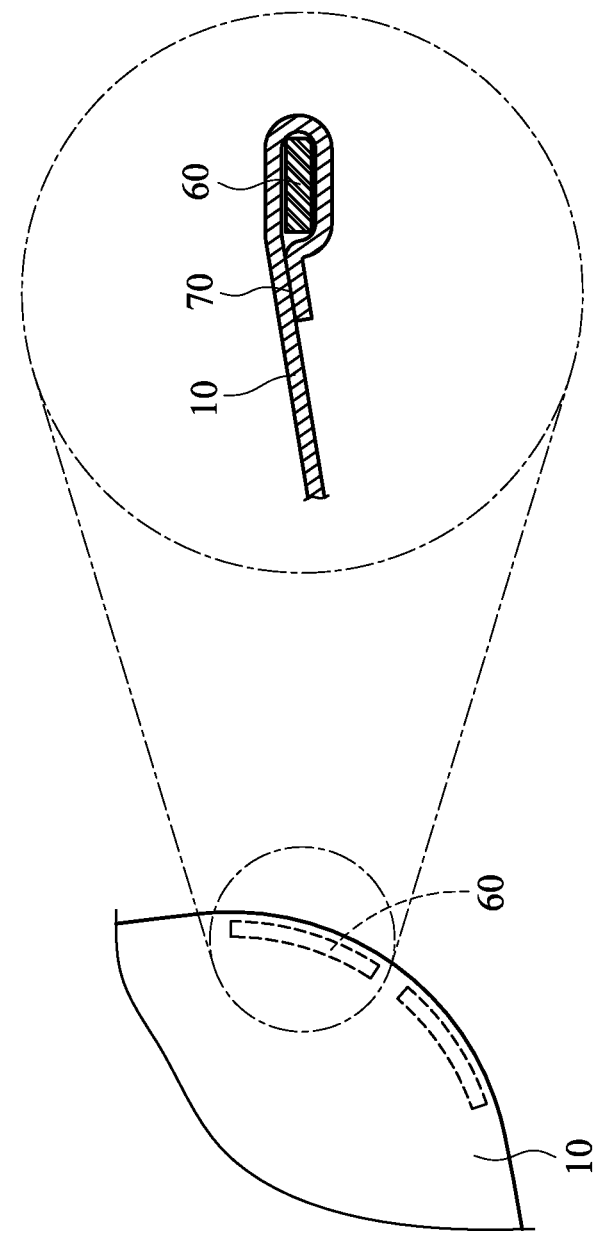
FIG. 1B is a schematic cross-sectional view of a first magnetic strip enclosed by a windshield cover according to the embodiment of the present invention.

Referring to FIG. 1A and FIG. 1B, the first magnetic strips 60, which are not connected to each other, can be enclosed by the windshield cover 10 and disposed at the upper edge 11, the two lateral sides 12, the lower edge 13, a border of the first extension portion 20, and a border of the second extension portion 30 of the windshield cover 10.

The first magnetic strips 60 each can be formed from a rubber magnet which is flat and bendable. The first magnetic strips 60 are provided in a manner that at least a said first magnetic strip 60 is disposed at each of the upper edge 11, the two lateral sides 12, the lower edge 13 of the windshield cover 10, the border of the first extension portion 20, and the border of the second extension portion 30.

Referring to FIG. 1B, each of the first magnetic strips 60 used by the automotive windshield cover structure 100 is enclosed by the windshield cover 10. After enclosing the first magnetic strips 60, the windshield cover 10 joins itself at a joining portion 70 by means of sewing or machine sewing to prevent the first magnetic strips 60 from escaping.

Figure 1C:
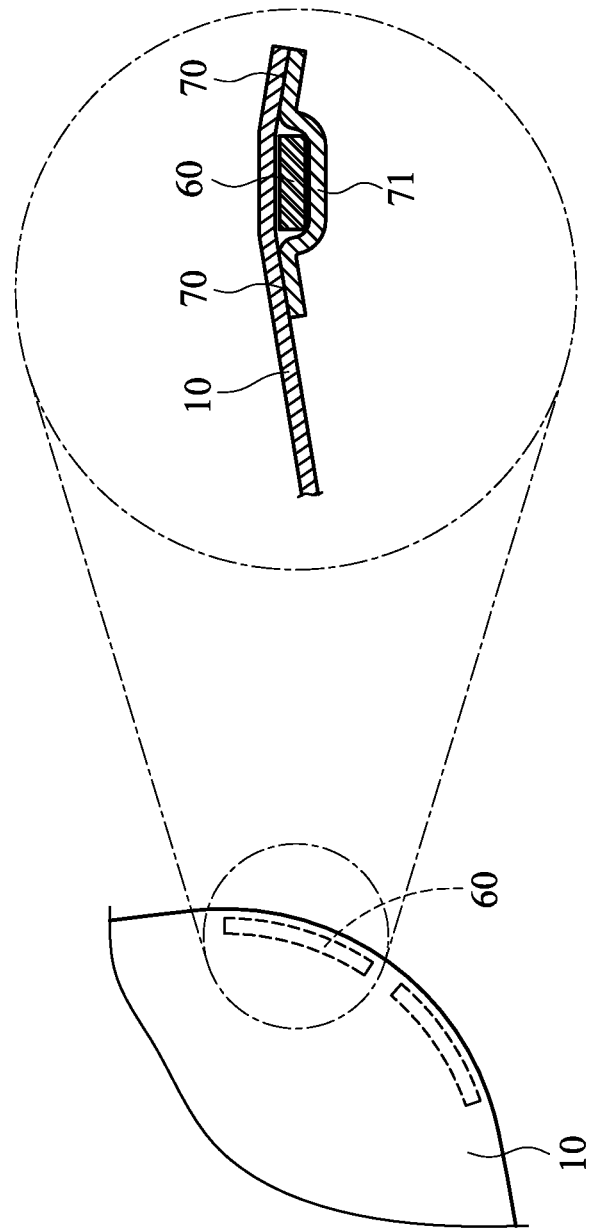
FIG. 1C is a schematic cross-sectional view of another first magnetic strip enclosed by the windshield cover according to the embodiment of the present invention.
Figure 2:
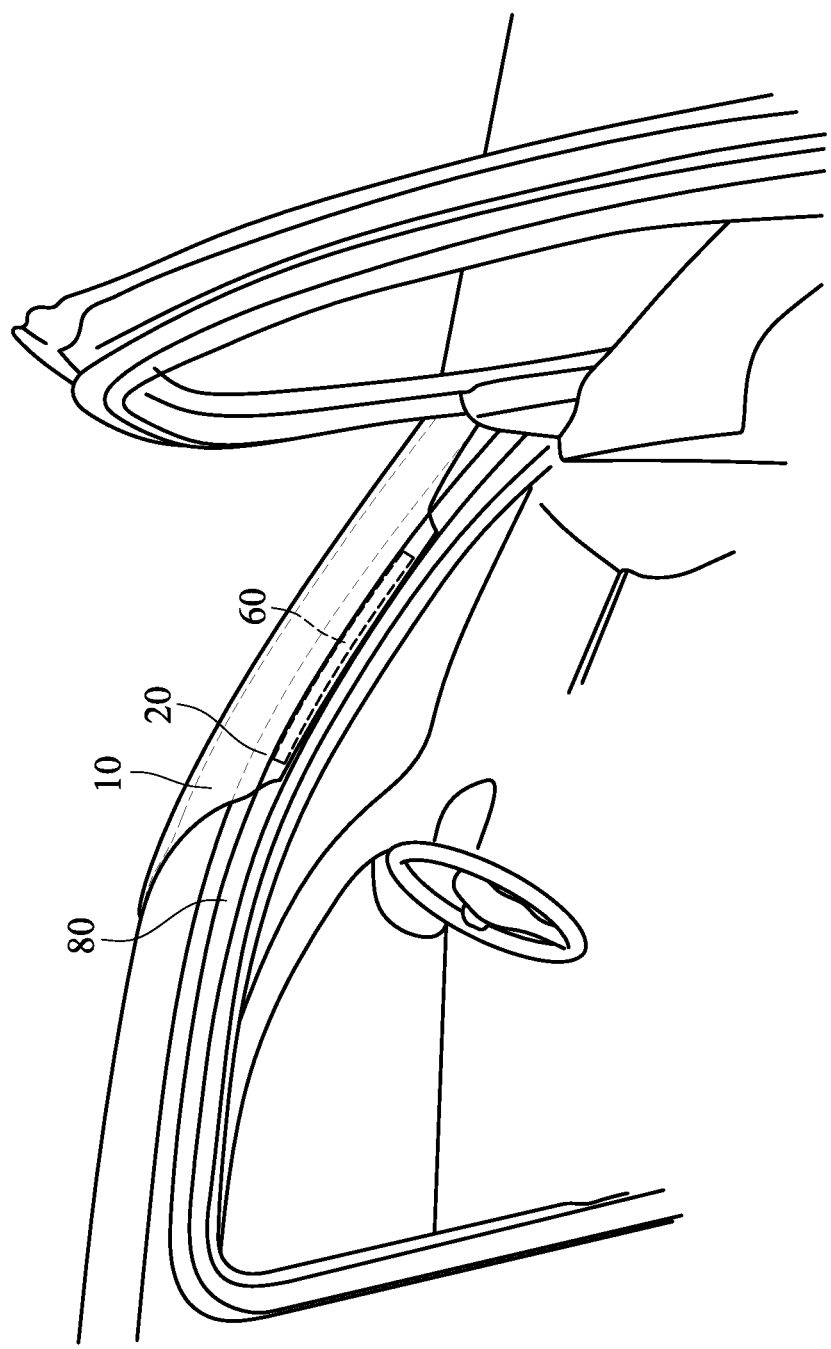
FIG. 2 is a schematic lateral perspective view which shows that the automotive windshield cover structure is mounted on a windshield of a vehicle and a door receiving groove of the vehicle according to the embodiment of the present invention.

Referring to FIG. 1C, alternatively, it is practicable for the windshield cover 10 to enclose the first magnetic strips 60, by covering the first magnetic strips 60 with a flap 71 disposed at the border of the windshield cover 10, sewing the windshield cover 10 and the flap 71 together by machine sewing, and allowing the first magnetic strips 60 to be enclosed between the windshield cover 10 and the flap 71 to prevent the first magnetic strips 60 from escaping.

Referring to FIG. 2 through FIG. 4B, the first magnetic strips 60, which are disposed at the upper edge 11, the lower edge 13 and the two lateral sides 12 of the windshield cover 10, are adhered to a portion of a vehicle body of the vehicle, wherein the portion of the vehicle body surrounds the windshield, whereas the first magnetic strips 60 disposed at the first extension portion 20 and the second extension portion 30 are adhered tightly to the door receiving groove 80 on one side of the vehicle and to another said door receiving groove 80 on the other side of the vehicle, respectively, such that the windshield cover 10 is fastened tightly to the windshield and the vehicle body to therefore protect the windshield.

Figure 3:
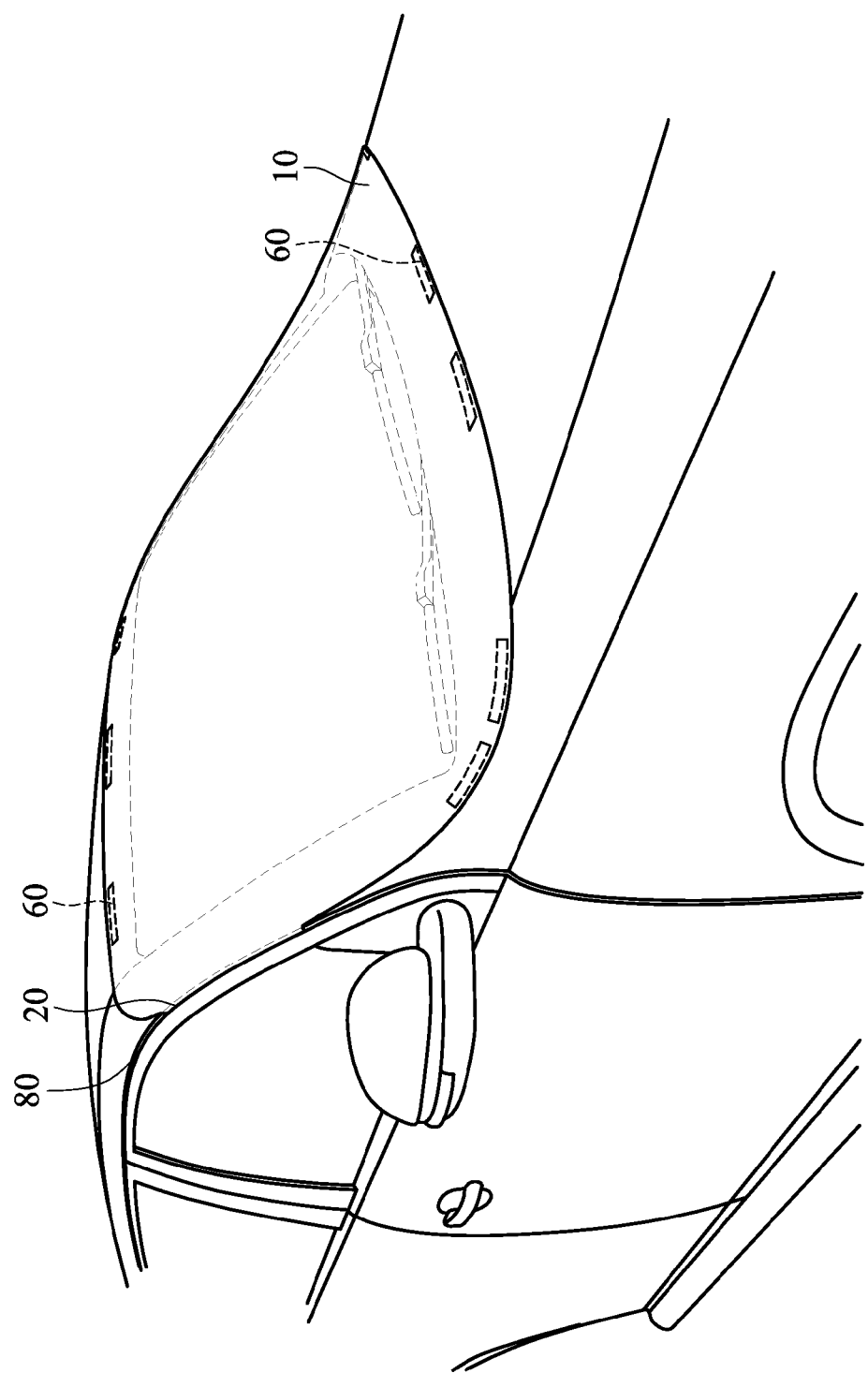
FIG. 3 is a schematic oblique perspective view which shows that the automotive windshield cover structure is mounted on the windshield and the door receiving groove according to one embodiment of the present invention.

Referring to FIG. 3, with the first extension portion 20 being adhered to the door receiving grooves 80 by the first magnetic strips 60, the shutting of the door of the vehicle not only allows the first extension portion 20 to be clamped, but also prevents the automotive windshield cover structure 100 from falling under gravity or being lifted by wind, not to mention that snow, water, or other foreign bodies cannot intrude into the vehicle through the automotive windshield cover structure 100.

Similarly, with the second extension portion 30 being adhered to the door receiving groove 80 on the other side of the vehicle by the first magnetic strips 60, the shutting of the door of the vehicle not only allows the second extension portion 30 to be clamped, but also prevents the automotive windshield cover structure 100 from falling under gravity or being lifted by wind, not to mention that snow, water, or other foreign bodies cannot intrude into the vehicle through the automotive windshield cover structure 100.

Figure 4A:
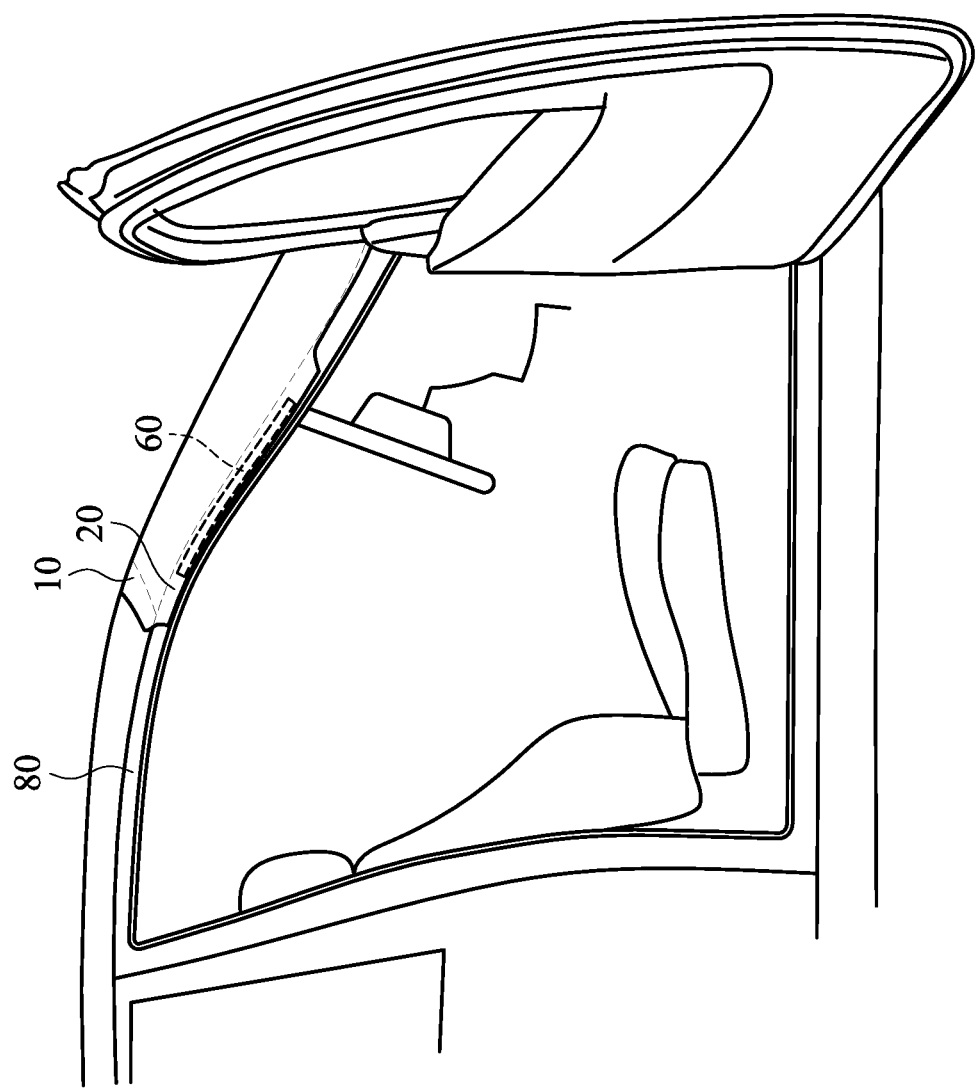
FIG. 4A is another schematic lateral perspective view which shows that the automotive windshield cover structure is mounted on the windshield and the door receiving groove according to the embodiment of the present invention.
Figure 4B:
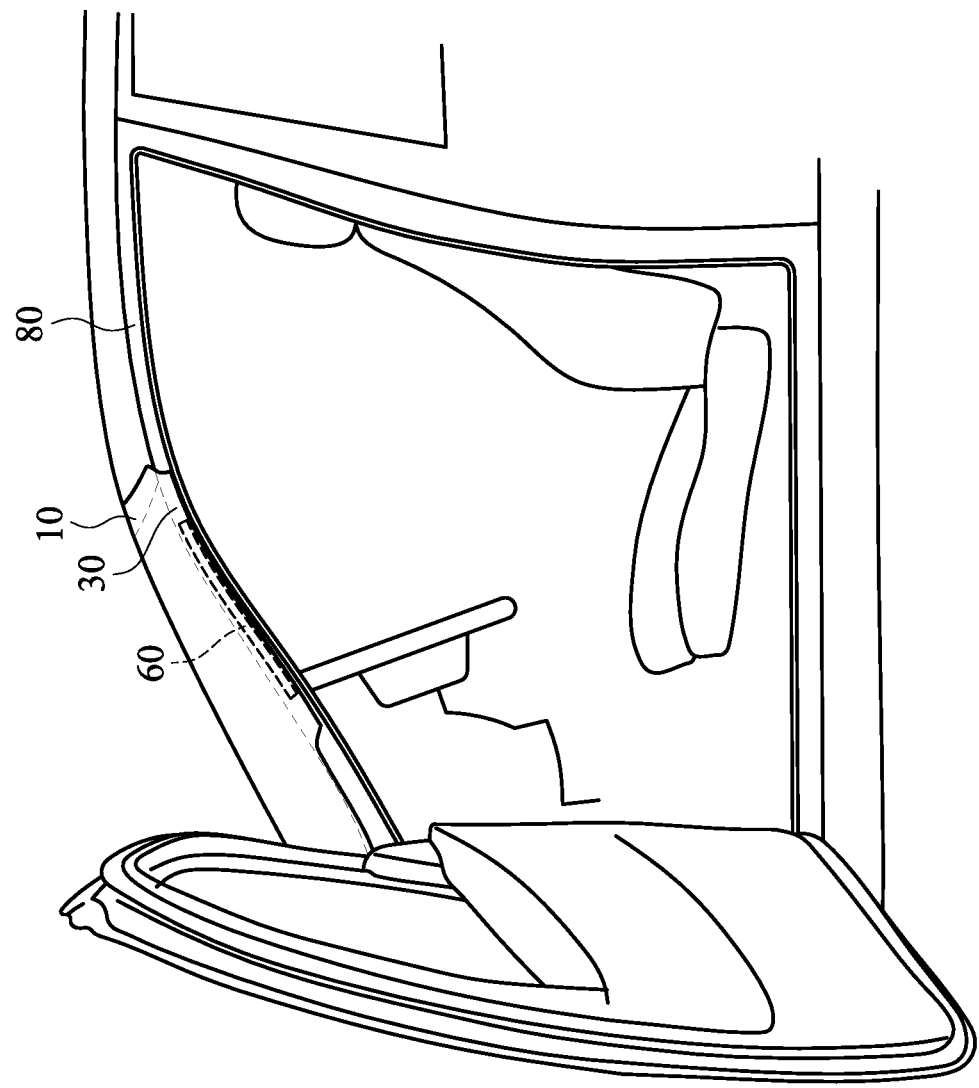
FIG. 4B is a schematic lateral perspective view watched from an angle of view opposite to that of FIG. 4A to show that the automotive windshield cover structure is mounted on the windshield and the door receiving groove according to the embodiment of the present invention.

Referring to FIG. 4A and FIG. 4B, there are shown schematic lateral perspective views which show that the automotive windshield cover structure is mounted on the windshield and the door receiving groove according to one embodiment of the present invention. The diagrams not only highlight the positions of the door receiving grooves 80 on the vehicle relative to each other, but also show that the first extension portion 20, the second extension portion 30, and the first magnetic strips 60 enclosed therein are received in the door receiving grooves 80, respectively, such that the windshield cover 10 covers the windshield smoothly.

Figure 5A:
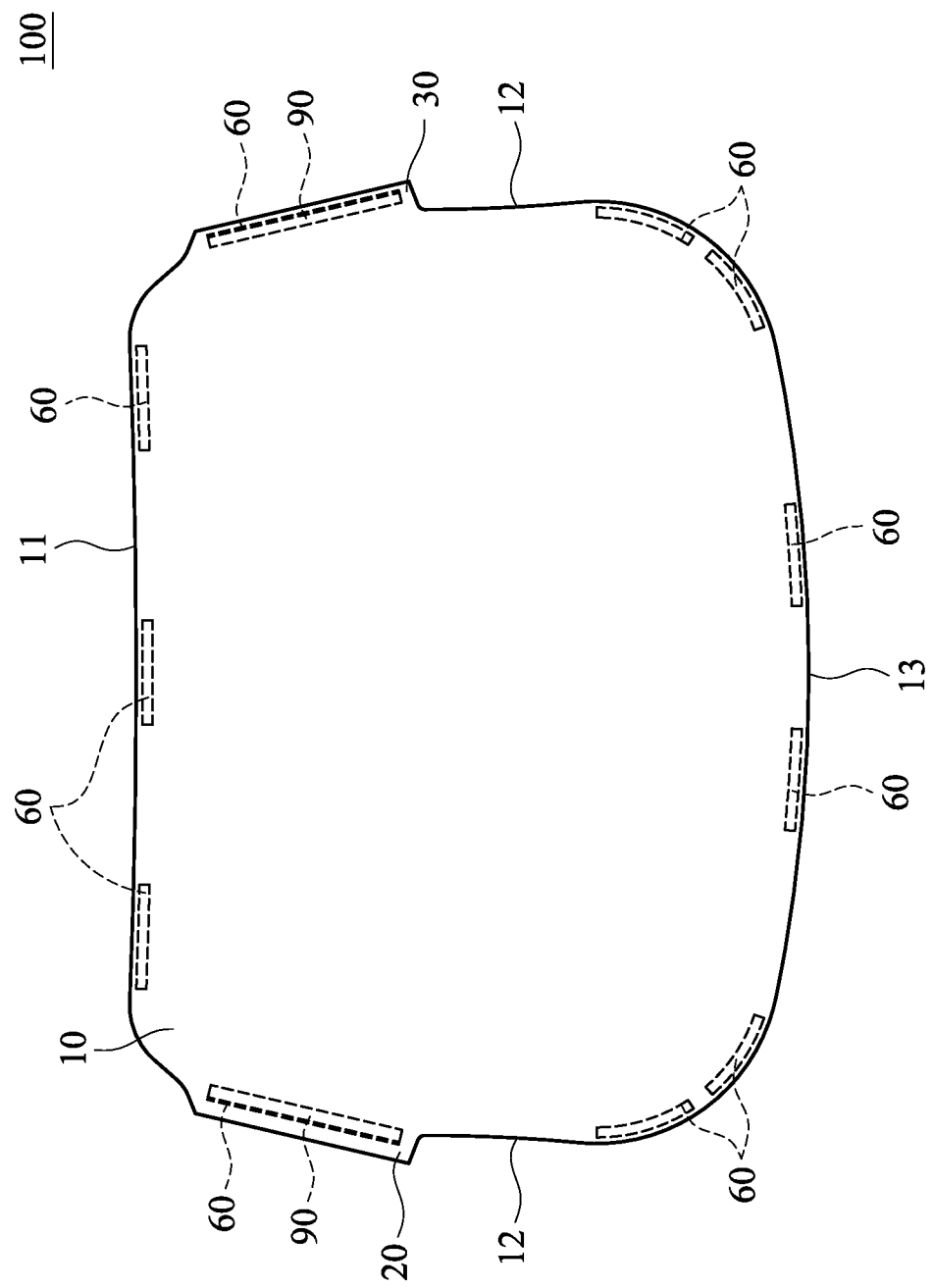
FIG. 5A is a schematic top view of another automotive windshield cover structure according to the embodiment of the present invention.
Figure 5B:
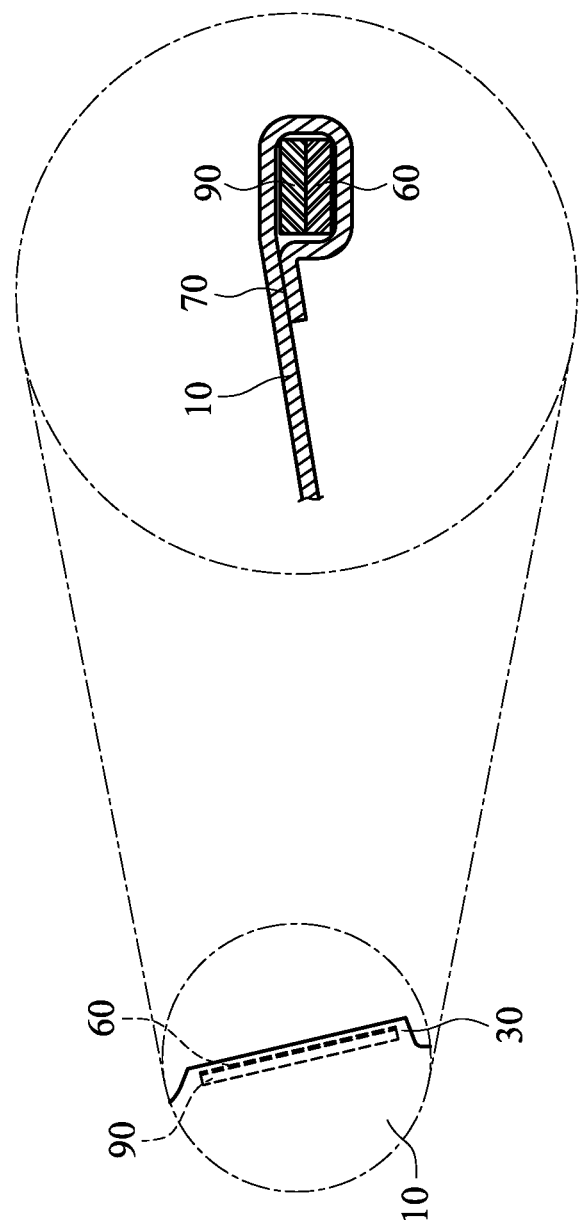
FIG. 5B is a schematic cross-sectional view of a second extension portion and its enclosed first magnetic strip in the embodiment illustrated with FIG. 5A.

Referring to FIG. 5A and FIG. 5B, the first magnetic strips 60 disposed at the first extension portion 20 and the second extension portion 30 are coupled to a foamed body 90 which demonstrates resilience such that, as soon as the door of the vehicle shuts tightly, the first and second extension portions 20, 30 are not only clamped easily but also engaged with the door receiving grooves 80 and thus prevented from falling under gravity. The foamed body 90 is coupled to the first magnetic strips 60 by adhesion or any other means of connection.

The first magnetic strips 60 are coupled to the foamed body 90 so as to be enclosed in the first extension portion 20 and the second extension portion 30. Hence, when the door of the vehicle shuts, not only can the first extension portion 20 and the second extension portion 30 of the automotive windshield cover structure 100 be more tightly clamped, but the foamed body 90 is also resilient and thus compressible enough to impose no negative effect on how tightly the door shuts, not to mention that snow, water or other foreign bodies cannot be guided across the windshield cover 10 to flow into or seep into the vehicle.

Figure 6A:
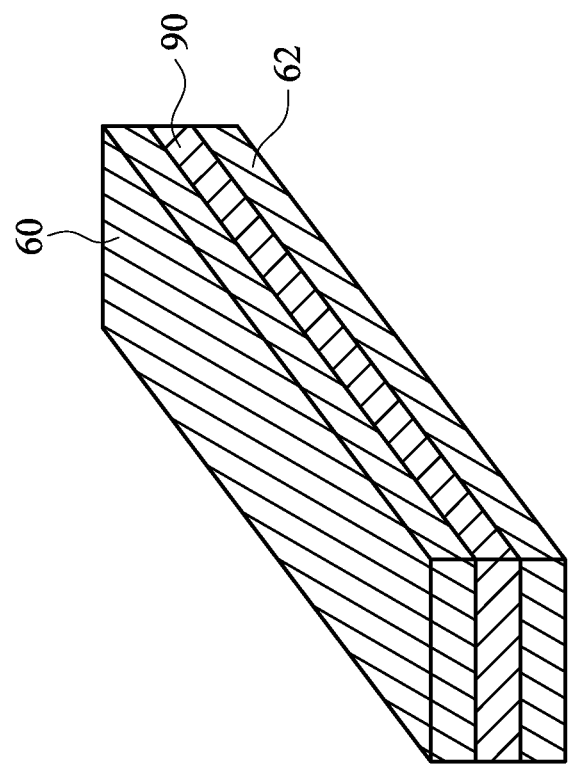
FIG. 6A is a schematic perspective view of a first magnetic strip with a foamed body and a second magnetic strip according to an embodiment of the present invention.
Figure 6B:
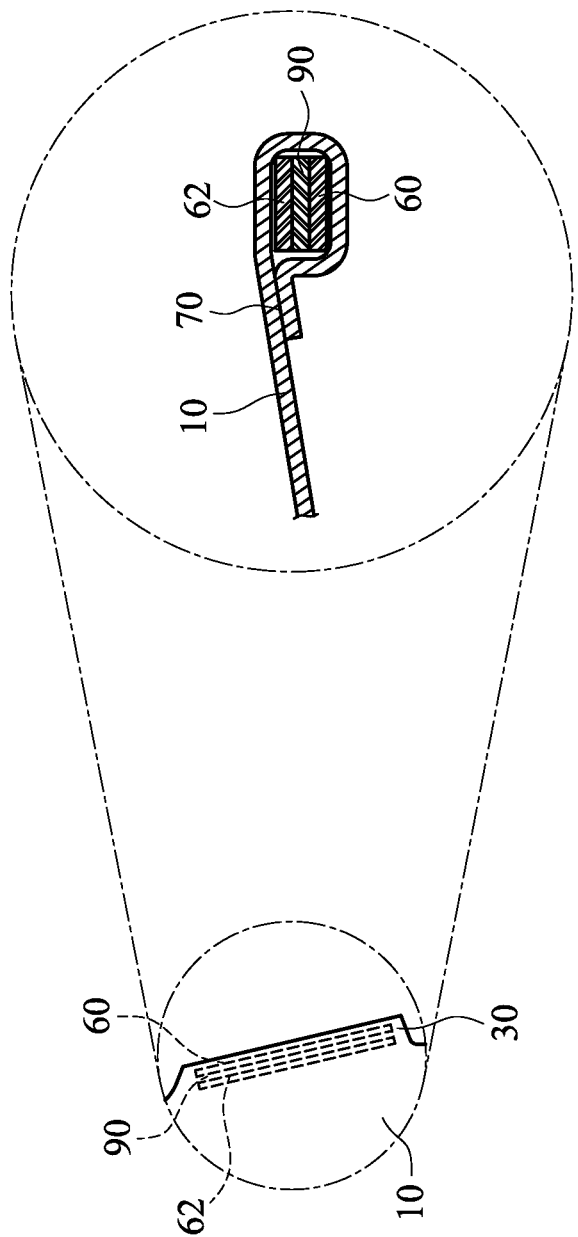
FIG. 6B is a schematic cross-sectional view of a second extension portion and its enclosed first magnetic strip with a foamed body and a second magnetic strip in the embodiment illustrated with FIG. 6A.

Moreover, please refer to FIG. 6A and FIG. 6B, each of the first magnetic strips 60 enclosed in the first extension portion 20 and the second extension portion 30, can also be coupled to the foamed body 90 and a second magnetic strip 62 in a form that foamed body 90 is fixed in between the first magnetic strip 60 and the second magnetic strip 62.

Figure 7:
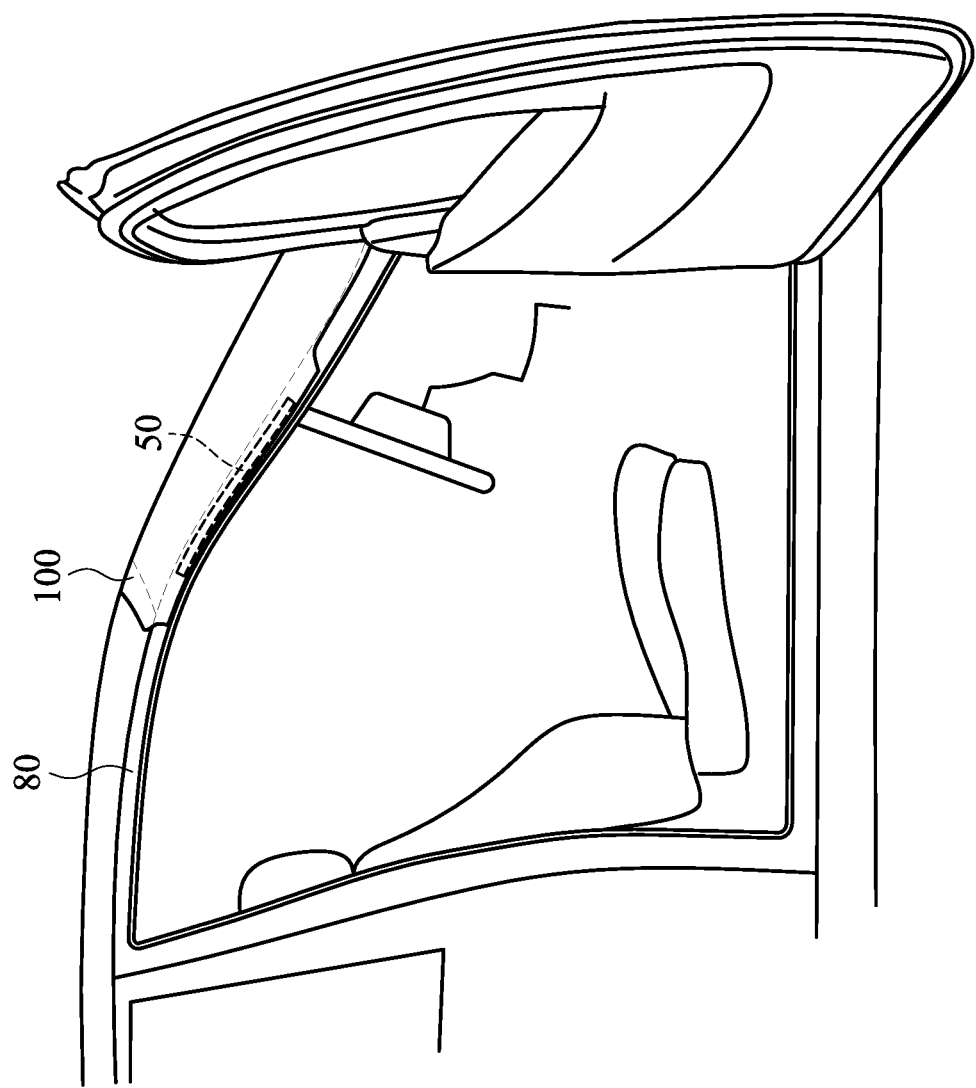
FIG. 7 is a schematic perspective view of a first magnetic strip which has a foamed body and is applicable to the automotive windshield cover structure according to the embodiment of the present invention.

Referring to FIG. 6A, FIG. 6B and FIG. 7, with the foamed body 90 fixed in between the first magnetic strip 60 and the second magnetic strip 62, one does not have to choose the facing surface that is to cover the windshield when using the automotive windshield cover structure 100, since when any of the two surfaces of the automotive windshield cover structure 100 is used, there is always at least one first magnetic strip 60 or second magnetic strip 62 to attach the windshield cover structure 100 firmly in the door receiving grooves 80 of the vehicle.

In other words, there is no need for one to choose right surface from wrong surface when using the windshield cover structure 100, since both surfaces can be used to attach the windshield cover structure 100 firmly in the door receiving grooves 80 of the vehicle.

Nonetheless, although it is not shown in the figures, the aforesaid first magnetic strip 60 or second magnetic strip 62 can each be formed from a flat and bendable rubber magnet.

Figure 8:
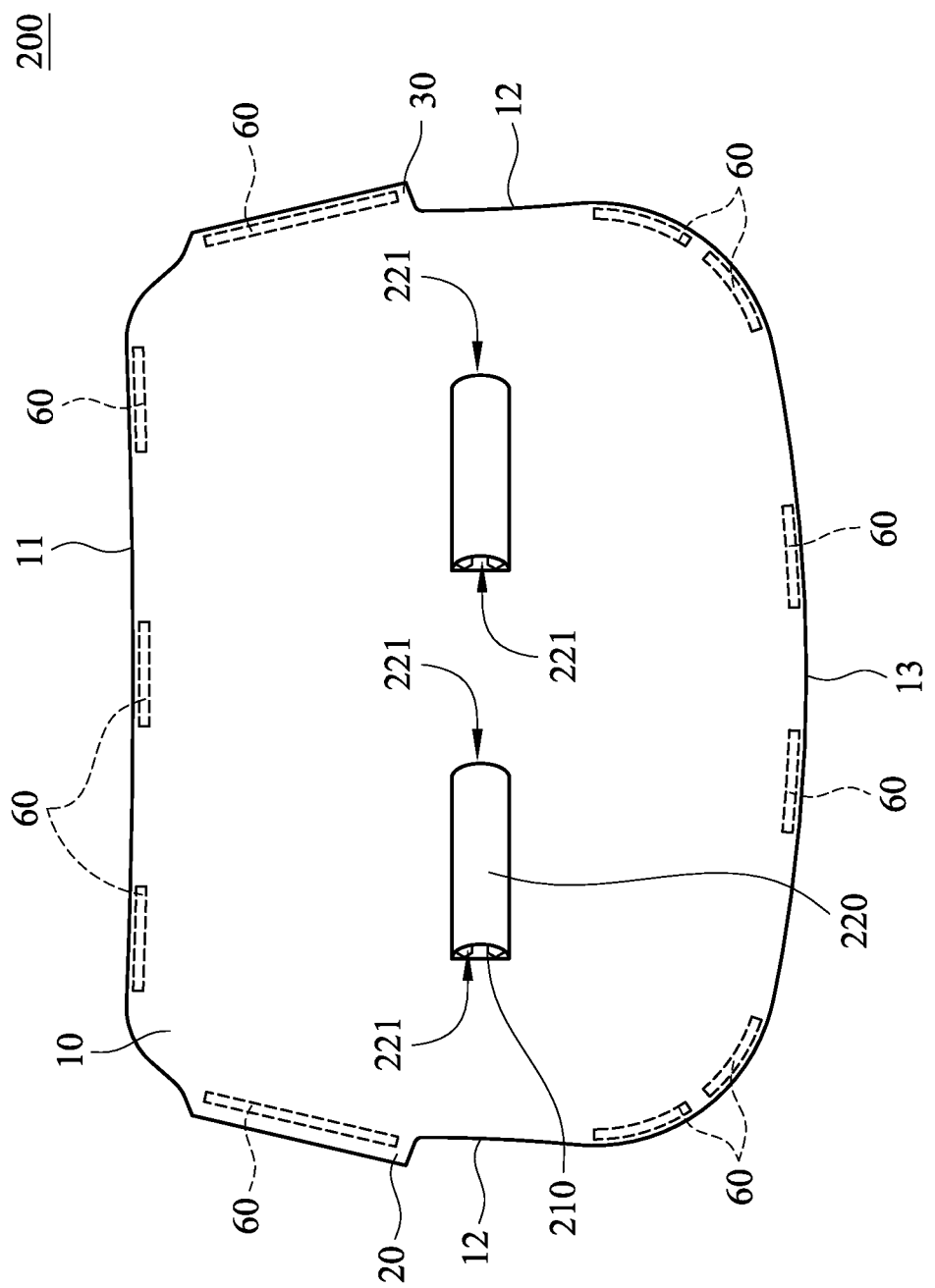
FIG. 8 is a schematic top view of an automotive windshield cover structure according to another embodiment of the present invention.

Please refer to FIG. 8, an windshield cover structure 200 can be formed by forming at least one air vent portion 210 and attaching at least one add-on portion 220 on the windshield cover structure 100.

Figure 9:
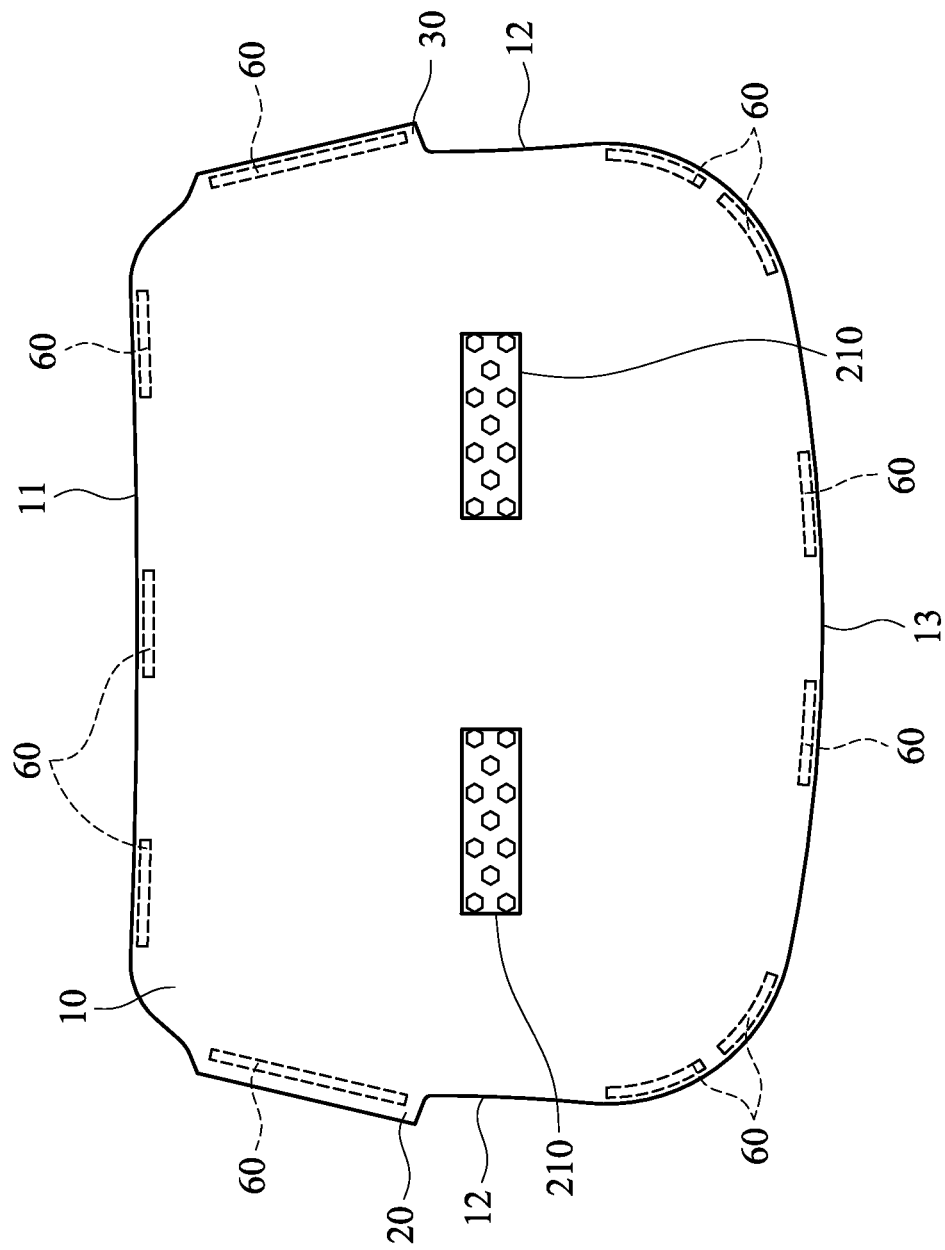
FIG. 9 is a schematic top view of a windshield cover and at least one air vent portion according to an embodiment of the present invention.
Figure 10:
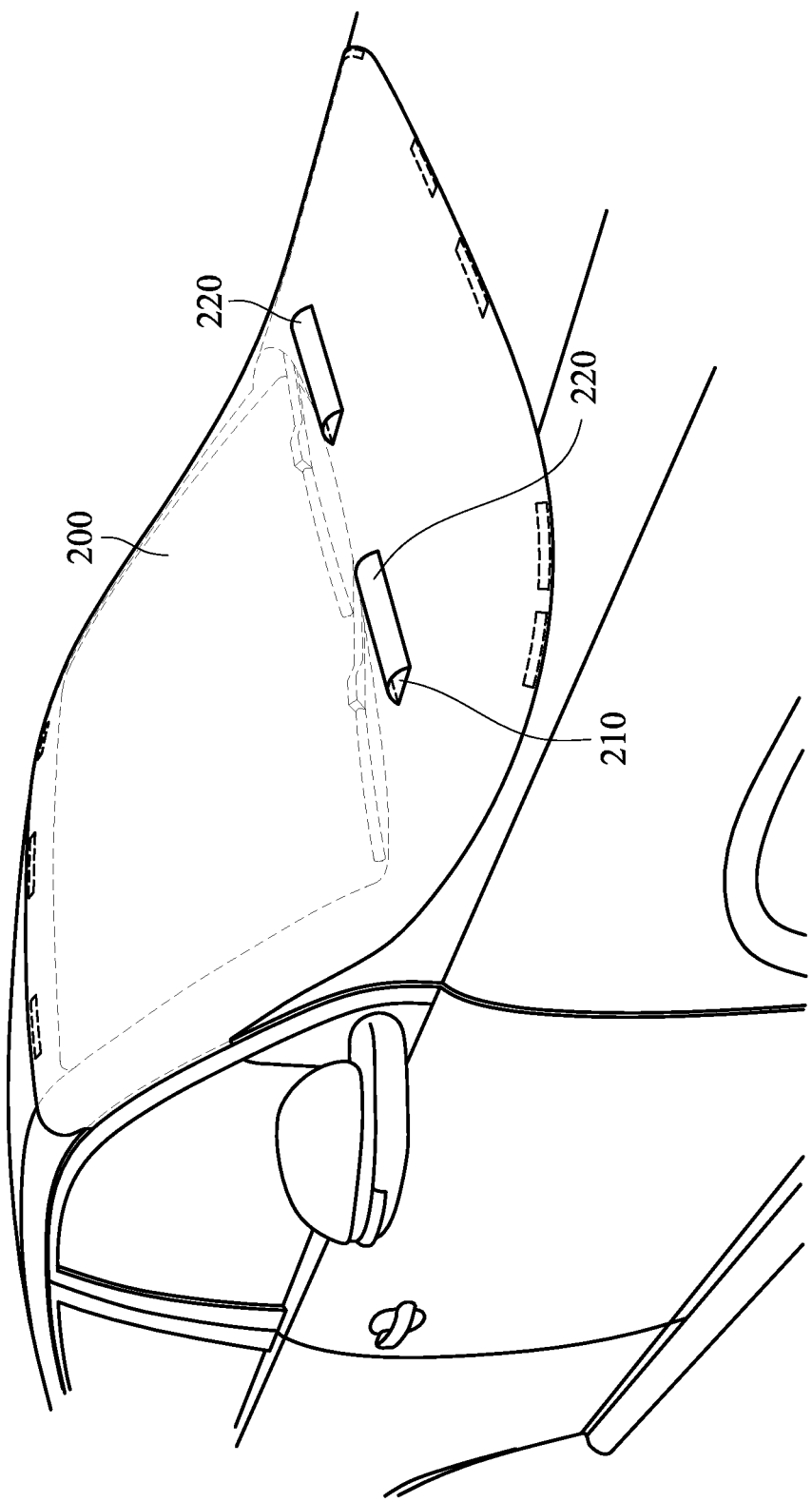
FIG. 10 is a schematic oblique perspective view which shows that the automotive windshield cover structure of FIG. 8 is mounted on the windshield according to one embodiment of the present invention.

Referring to FIG. 8 to FIG. 10, the air vent portion 210 is formed on the wind shield cover 10, and can be at least one hole formed on the wind shield cover 10.

Thus, when the windshield of the vehicle is covered by the windshield cover structure 200 and wind blows air inside between the windshield and the windshield cover structure 200, the air can be vented through the air vent portion 210 from affecting the proper functioning of the windshield cover structure 200.

Please refer also to FIG. 8 to FIG. 10, the add-on portion 220 can be formed by waterproof material and attached firmly on the windshield cover 10 with at least one end of the add-on portion 220 not in contact with the windshield cover 10 to form at least one venting hole 221, and each said air vent portion 210 is shielded by one add-on portion 220 without contacting that add-on portion 220.

That is to say, the air vented from the air vent portion 210 is released from the venting hole 221 of the add-on portion 220. And when the number of the venting hole 221 is two, the extension line drawn from these two venting holes 221 can be in parallel with the upper edge of the windshield of the vehicle, this prevents the add-on portion 220 from suffering from the invasion of rain, snow or debris to fall inside the windshield cover structure 200 when releasing air.

As can be seen in the embodiments above, the automotive windshield cover structure 100 or the automotive windshield cover structure 200, each with the first magnetic strip 60, or with the first magnetic strip 60 and the foamed body 90, or with the first magnetic strip 60 and the foamed body 90 and the second magnetic strip 62, can all be removably mounted on a windshield of a vehicle, preventing the windshield from stacking snow or water drops of rain, and attached firmly in the door receiving grooves 80 of the vehicle to prevent snow, rain or debris from falling inside the vehicle along the automotive windshield cover structure 100 or the automotive windshield cover structure 200.

Figure 11:
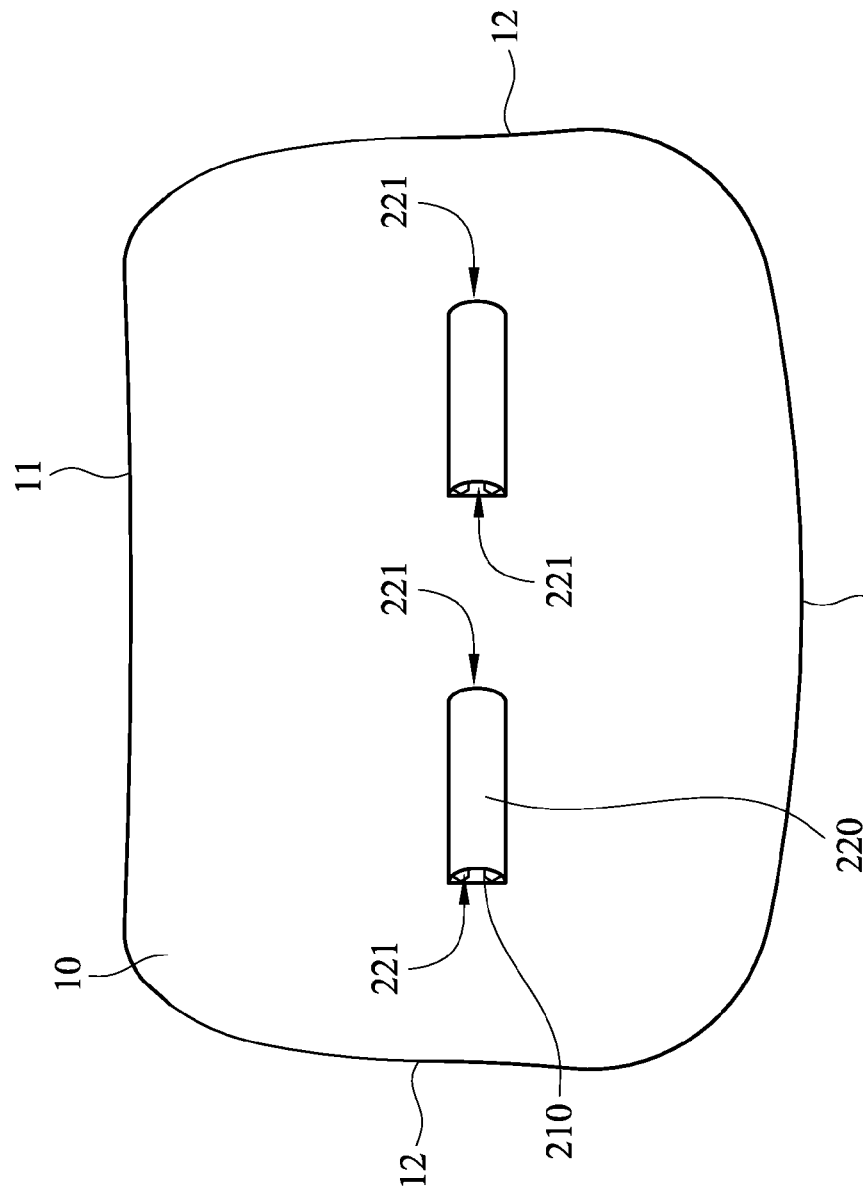
FIG. 11 is a schematic top view of an automotive windshield cover structure according to still another embodiment of the present invention.

Please refer next to FIG. 11, in another embodiment of the present invention, an automotive windshield cover structure 300 that can be removably mounted on a windshield of a vehicle. The automotive windshield cover structure 300 comprises a windshield cover 10, at least one air vent portion 210 and at least one add-on portion 220.

Referring to FIG. 11 and FIG. 12, the windshield cover 10 can removably cover the windshield of a vehicle. The windshield cover 10 has an upper edge 11, two lateral sides 12 extending from the upper edge 11, and a lower edge 13 opposing the upper edge 11 and connecting with two lateral sides 12. The windshield cover 10 is large enough to cover the whole windshield and extends to a portion of a vehicle body of the vehicle, wherein the portion of the vehicle body surrounds the windshield.

Referring again to FIG. 11 and FIG. 12, the air vent portion 210 of the automotive windshield cover structure 300 is formed on the windshield cover 10, and can be at least one hole formed on the wind shield cover 10. When the windshield of the vehicle is covered by the windshield cover structure 300 and wind blows air inside between the windshield and the windshield cover structure 300, the air can be vented through the air vent portion 210 from affecting the proper functioning of the windshield cover structure 300.

Also in FIG. 11 and FIG. 12, in an embodiment of the add-on portion 220, the add-on portion 220 can be formed by waterproof material and attached firmly on the windshield cover 10 with two opposite ends of the add-on portion 220 not in contact with the windshield cover 10 to form two venting holes 221, and each said air vent portion 210 is shielded by one add-on portion 220 without contacting that add-on portion 220.

The air vented from the air vent portion 210 is released from the venting holes 221 of the add-on portion 220. And the extension line drawn from these two venting holes 221 can be in parallel with the upper edge of the windshield of the vehicle, this prevents the add-on portion 220 from suffering from the invasion of rain, snow or debris to fall inside the windshield cover structure 300 when releasing air through the air flow by the two venting holes 221.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. An automotive windshield cover structure, comprising:
    a windshield cover for removably covering a windshield of a vehicle, the windshield cover having an upper edge, two lateral sides extending from the upper edge, and a lower edge opposing the upper edge and connecting with the two lateral sides;
    a first extension portion extended outward from the windshield cover, disposed at one of the two lateral sides, and positioned proximate to the upper edge; and
    a second extension portion extended outward from the windshield cover, disposed at another one of the two lateral sides, and positioned proximate to the upper edge;
    wherein, the first extension portion and the second extension portion each encloses at least one first magnetic strip, respectively, and thus adhere to door receiving grooves on two opposing sides of the vehicle, respectively;
    wherein each of the first magnetic strips disposed at the first extension portion and the second extension portion is coupled to a resilient foamed body and a second magnetic strip, and the resilient foamed body is fixed in between the first magnetic strip and the second magnetic strip.

2. The automotive windshield cover structure of claim 1, wherein each of the first magnetic strips disposed at the first extension portion and the second extension portion is coupled to a resilient foamed body.

3. The automotive windshield cover structure of claim 1, wherein the upper edge and the lower edge each encloses at least one first magnetic strip.

4. The automotive windshield cover structure of claim 2, wherein the upper edge and the lower edge each encloses at least one first magnetic strip.

5. The automotive windshield cover structure of claim 1, wherein the upper edge and the lower edge each encloses at least one first magnetic strip.

6. The automotive windshield cover structure of claim 1, wherein the first magnetic strip is formed from a flat and bendable rubber magnet.

7. The automotive windshield cover structure of claim 2, wherein the first magnetic strip is formed from a flat and bendable rubber magnet.

8. The automotive windshield cover structure of claim 1, wherein the second magnetic strip is formed from a flat and bendable rubber magnet.

9. The automotive windshield cover structure of claim 1, wherein at least one air vent portion and at least one add-on portion are formed on the wind shield cover, wherein the said at least one air vent portion is at least one hole formed on the wind shield cover and the said at least one add-on portion is attached firmly on the windshield cover with at least one end of the at least one add-on portion not in contact with the windshield cover to form at least one venting hole, and each said at least one air vent portion is shielded by one said at least one add-on portion.

10. An automotive windshield cover structure, comprising:
    a windshield cover for removably covering a windshield of a vehicle, the windshield cover having an upper edge, two lateral sides extending from the upper edge, a lower edge opposing the upper edge and connecting with the two lateral sides;
    at least one air vent portion formed on the wind shield cover; and
    at least one add-on portion attached firmly on the wind shield cover, wherein two opposite ends of the at least one add-on portion are not in contact with the windshield cover to form two venting holes on the two opposite ends, and each said at least one air vent portion is shielded by one said at least one add-on portion.

11. The automotive windshield cover structure of claim 10, wherein each said at least one air vent portion is at least one hole formed on the wind shield cover.

12. The automotive windshield cover structure of claim 10, wherein the upper edge, the two lateral sides, and the lower edge of the windshield cover each encloses at least one first magnetic strip, respectively.

* * * * *